United States Patent
Huang et al.

[19]

[11] Patent Number: 5,980,610
[45] Date of Patent: Nov. 9, 1999

[54] APPARATUS AND METHOD FOR IMPROVING ELECTROSTATIC PRECIPITATOR PERFORMANCE BY PLASMA REACTOR CONVERSION OF $SO_2$ TO $SO_3$

[75] Inventors: Hann-Sheng Huang, Darien; Anthony J. Gorski, Woodridge, both of Ill.

[73] Assignee: The United States of America as represented by the United States Department of Energy, Washington, D.C.

[21] Appl. No.: 08/937,170

[22] Filed: Sep. 25, 1997

[51] Int. Cl.$^6$ .................................................. B03C 3/013
[52] U.S. Cl. ........................ 95/58; 95/60; 96/74; 96/223; 110/216; 110/345; 422/21; 422/22; 422/121
[58] Field of Search ................................... 95/69, 70, 63, 95/58, 60; 96/55, 57, 56, 74, 223; 422/22, 121, 186, 21, 186.04; 423/244.01; 110/216, 345; 204/164, 174

[56] References Cited

U.S. PATENT DOCUMENTS

| | | | |
|---|---|---|---|
| 3,581,463 | 6/1971 | Roberts | 95/58 |
| 3,993,429 | 11/1976 | Archer | 95/60 X |
| 5,011,516 | 4/1991 | Altman et al. | 95/58 |
| 5,020,457 | 6/1991 | Mathur et al. | 110/345 |
| 5,244,642 | 9/1993 | Hankins et al. | 95/58 X |
| 5,320,052 | 6/1994 | Spkoyny et al. | 110/345 |
| 5,356,957 | 10/1994 | Wright et al. | 422/169 |
| 5,540,755 | 7/1996 | Spkoyny et al. | 95/3 |
| 5,547,495 | 8/1996 | Wright et al. | 96/74 |
| 5,665,142 | 9/1997 | Wright | 95/58 |

OTHER PUBLICATIONS

Dhali, Shirshak K., Plasma–Assisted Cleanup of Flue Gas, Final Technical Report–Issued Dec. 1994, pp. 2, 4, 6, 8, 10, and Abstract.

*Primary Examiner*—Richard L. Chiesa
*Attorney, Agent, or Firm*—Mark F. LaMarre; Mark P. Dvorscak; William R. Moser

[57] ABSTRACT

An apparatus and process that utilize a low temperature nonequilibrium plasma reactor, for improving the particulate removal efficiency of an electrostatic precipitator (ESP) are disclosed. A portion of the flue gas, that contains a low level of $SO_2$ $O_2$ $H_2O$, and particulate matter, is passed through a low temperature plasma reactor, which defines a plasma volume, thereby oxidizing a portion of the $SO_2$ present in the flue gas into $SO_3$. An $SO_2$ rich flue gas is thereby generated. The $SO_3$ rich flue gas is then returned to the primary flow of the flue gas in the exhaust treatment system prior to the ESP. This allows the $SO_3$ to react with water to form $H_2SO_4$ that is in turn is absorbed by fly ash in the gas stream in order to improve the removal efficiency of the EPS.

12 Claims, 8 Drawing Sheets

SYSTEM FOR IMPROVING ELECTROSTATIC PRECIPITATOR PERFORMANCE

SYSTEM FOR IMPROVING ELECTROSTATIC PRECIPITATOR PERFORMANCE

MICROWAVE PLASMA OXIDATION SYSTEM

MICROWAVE PLASMA OXIDATION SYSTEM

APPARATUS AND METHOD FOR IMPROVING ELECTROSTATIC PRECIPITATOR PERFORMANCE BY PLASMA REACTOR CONVERSION OF $SO_2$ TO $SO_3$

STATEMENT REGARDING FEDERALLY SPONSORED RESEARCH OR DEVELOPMENT

The United States Government has rights in this invention pursuant to Contract No. W-31-109-Eng-38 between the U.S. Department of Energy and the University of Chicago representing Argonne National Laboratory.

BACKGROUND OF THE INVENTION

Field of the Invention

This invention relates to the operation of electrostatic precipitators for use in fossil fuel fired power plants which use low sulfur fuels to generate heat or electricity. More particularly, this invention relates to an improved apparatus and process for increasing the particulate removal efficiency of electrostatic precipitators used in such facilities by the conversion of sulfur dioxide, present in the flue gas stream, to sulfur trioxide which reacts with the fly ash to improve the electrical conductivity of the fly ash.

Fuels, typically fossil fuels, are combusted with air in a boiler to generate heat. The heat generated is converted into useful energy to heat a product or process, or to produce electricity. The fossil fuels normally used, such as coal or oil, contained sulfur. When coal is burned, the products of combustion include particulate matter (commonly known as fly ash), sulfur dioxide ($SO_2$) and water, which are exhausted from the boiler as part of an exhaust stream known as flue gas. Fly ash and $SO_2$ are both undesirable pollutants and must be removed from the flue gas to a desirable level. These levels are normally set by environmental regulatory agencies.

In most fossil fuel-fired plants, fly ash in the flue gas stream is removed by electrostatic precipitation. An electrostatic charge is applied to the fly ash in the flue gas stream as the flue gas passes between charged electrodes contained in an electrostatic precipitator. The particulate matter is deposited upon the electrode having the opposite charge to that of the fly ash and is later removed. The efficiency with which fly ash is removed from the flue gas stream by the electrostatic precipitator depends in part upon the electrical conductivity of the fly ash. This, in turn, is influenced by the absorption by the particles of fly ash, of sulfuric acid ($H_2SO_4$) that is generated as a by-product of the combustion process through the reaction of $SO_2$ with oxygen and water in the flue gas stream. The sulfuric acid deposited upon the particulate matter imparts a degree of electrical conductivity to the particulate and promotes the electrostatic precipitation process.

When fuels having a relative large sulfur contents are used, only a portion of the $SO_2$ generated by combustion is converted to the sulfuric acid required for conditioning the fly ash. Absent expensive process equipment for removing $SO_2$ from the flue gas stream, the excess $SO_2$ in the flue gas is exhausted to the atmosphere. This is undesirable since $SO_2$ can cause pollution problems, such as acid rain. One alternative to reduce the amount of $SO_2$ generated by the combustion process is to use fuel that is lower in sulfur content. However, the combustion of low sulfur coal would also result in the amount of $SO_3$ produced by the combustion process being insufficient to produce the quantities of sulfuric acid required to efficiently remove fly ash at the electrostatic precipitator. To combat this problem power plant operators have been introducing sulfur trioxide ($SO_3$) from other sources into the flue gas stream or generating $SO_3$ by catalytic means within the exhaust system of the power plant.

Archer et al., U.S. Pat. No. 3,993,429 and Hankins et al., U.S. Pat. No. 5,244,642, disclose burning sulfur in air to produce $SO_2$, which is then catalytically oxidized to $SO_3$. The $SO_3$ generated by the processes of Archer and Hankins is directed into the flue gas stream where it reacts with water vapor from the combustion process to form sulfuric acid, which is in turn absorbed by the fly ash. The process of Hankins further provides for a control loop that maintains a constant level of $SO_2$ produces based upon the fly ash content of the exhaust gas.

Processes that burn sulfur such as Archer and Hankins et al., provide a simple, direct solution to the problem of providing a sufficient amount of $SO_3$ in a flue gas stream to permit the efficient removal of fly ash by electrostatic precipitation. However, these processes require the addition of extra sulfur to the flue gas exhaust stream which must be removed later in the combustion process by additional pollution control equipment. Further, a separate combustion system must be monitored and maintained. The catalytic system for conversion of $SO_2$ to $SO_3$ must also be maintained and replenished with fresh catalysts.

Spokoyny et al., U.S. Pat. No. 5,320,052 describes a sulfur trioxide conditioning system that includes a catalytic converter that oxidizes a portion of the sulfur dioxide in a flow of flue gas to sulfur trioxide. The catalytic converter incorporates a catalyst support, which is disposed across at least a portion of the cross section of a main duct from a burner to a heat recovery apparatus, and a catalyst on the catalyst support. The amount of the catalyst surface exposed to the flow of flue gas is selectively varied to control the conversion of sulfur dioxide to sulfur trioxide. Spokoyny et al., U.S. Pat. No. 5,540,755 discloses an aspirating device to draw $SO_2$ laden flue gas through the catalyst beds.

The devices of the Spokoyny patents provide a catalytic oxidation system for conversion of $SO_2$ to $SO_3$. As with any catalytic system, provisions must be made to compensate for the pressure drop across the catalytic bed. This pressure drop represents a loss of energy that must be made up for with additional fans or blowers. Further, as with all catalytic systems the catalyst becomes deactivated or poisoned with use. The catalyst must be monitored and replenished as needed. This is extremely difficult from a plant operating perspective when the catalyst is located within a transport line as disclosed in the Spokoyny patents.

Alternative catalytic oxidation systems have been disclosed by Altman et al., U.S. Pat. No. 5,011,516, and U.S. Pat. Nos. 5,356,597 and 5,547,495 to Wright et al.

Altman describes an alternate approach in which a flue gas stream is divided into two streams. One flue gas stream is passed through a heat exchanger and continues on to a bag house for particulate removal. The second flue gas stream is passed over a catalyst. A portion of the sulfur dioxide in the second stream is oxidized to sulfur trioxide, and the two streams are then merged back into the main flue gas flow prior to the bag house. The second stream is not passed over a heat exchanger since the gas stream must be maintained at a high temperature to permit efficient conversion of sulfur dioxide to sulfur trioxide. While of interest, this approach has major drawbacks when implemented. System thermal efficiency is reduced because less heat is recovered. Further, there is typically insufficient mixing of the slip stream and the main flow at the point where they rejoin due to an insufficient pressure differential. Moreover, the Altman patent does not disclose any approach which permits control of the amount of sulfur trioxide produced, responsive to variations in the sulfur content of the fuel and changes in other operating parameters.

The Wright patents disclose a catalytic oxidation system in which a catalyst bed is maintained in a slidably mounted platform within the duct connecting the combustion chamber with the electrostatic precipitator. While the devices of Wright provide for the easy removal of the catalyst bed from the flue gas duct for servicing, the problems associated with catalyst deactivation and poisoning is still present.

A system for the simultaneous destruction of $SO_2$ and $NO_x$ by a plasma reactor has been disclosed by Mathur et al., U.S. Pat. No. 5,020,457. Ammonia, methane, steam, hydrogen, nitrogen or combinations of these gases are subjected to plasma conditions sufficient to create free radicals, ions or excited atoms. These ions or atoms are then reacted with $SO_2$ and $NO_x$ in the flue gas stream to produce environmentally safe compounds or compounds that can easily be removed from the flue gas stream. In PLASMA-ASSISTED CLEANUP OF FLUE GAS, by S. K. Dhali it is suggested to convert $SO_2$ and $NO_x$ to stable acid mists which can be removed by mist eliminators.

BRIEF SUMMARY OF THE INVENTION

An object of this invention is to provide an apparatus for the conversion of at least part of the sulfur dioxide present in the flue gas into sulfur trioxide without the need to provide significant modification to the existing gas treatment apparatus and process.

Another object of this invention is to provide an apparatus for the conversion of at least part of the sulfur dioxide present in the flue gas into sulfur trioxide wherein such apparatus is not readily deactivated or damaged by the exhausted flue gas.

Another object of this invention is to provide a process for the conversion of at least a part of the sulfur dioxide present in the flue gas into sulfur trioxide without the need to provide significant modification to the existing gas treatment apparatus and process.

Another object of this invention is to provide a process for the conversion of a portion of the sulfur dioxide present in the flue gas stream that will minimize the energy lost due to lost heat and process inefficiencies.

These and other objectives of the invention, which will become apparent from the following description, have been achieved by a novel system for the oxidation of the sulfur dioxide, present in a primary flue gas stream, to sulfur trioxide. The sulfur dioxide is discharged from a fossil-fuel fired combustion device through a main duct to particulate removal equipment for subsequent discharge to the atmosphere. The conversion system comprises a low temperature plasma reactor, the interior of which defines a plasma volume. A portion of the primary flue gas stream is directed to the plasma volume and is passed through the plasma volume. A fraction of the sulfur dioxide present in the flue gas is converted into a sulfur trioxide to form a sulfur trioxide-laden flue gas. The sulfur trioxide laden flue gas is then returned to the primary flue gas stream upstream of the particulate removal equipment. Preferably the plasma reactor is a low temperature nonequilibrium plasma reactor. Low-temperature herein means an increase in the temperature of the gas exiting from the plasma volume of from about 25° C. to about 100° C. above the temperature of the gas entering the plasma volume.

The means for directing a portion of the primary flue gas stream to the plasma volume may withdraw flue gas from the ductwork located upstream or downstream of the particulate removal equipment. Preferably the gas is removed from the ductwork downstream of the particulate removal equipment in order to reduce the dust loading within the plasma volume.

An air preheater assembly may be arranged upstream of the particulate removal equipment electrostatic precipitator in the main duct. The means for returning the sulfur trioxide laden flue gas to the primary flue gas may be attached to the main duct upstream or downstream of the air preheater assembly.

Preferably the plasma reactor comprises a plasma reactor tube having an inlet end and a discharge end, wherein the interior of the plasma reaction tube from the inlet to the discharge defines the plasma volume; a microwave generator coupled to the plasma reactor tube; and an electric power supply electrically coupled to the microwave generator.

The means for directing a portion of the primary flue gas stream to the plasma volume, the plasma reactor and the means for returning the sulfur trioxide laden flue gas to the primary flue gas stream may be located within the main duct upstream of the particulate removal equipment.

Preferably, the conversion system for the oxidation of sulfur dioxide in a primary flue gas stream, that is discharged from a fossil-fuel fired combustion device, comprises; a fuel burning device for the combustion of sulfur containing fuels, an electrostatic precipitator; and a plasma reactor. The electrostatic precipitator has an inlet end and an outlet end. A first duct connects the fuel burning device to the inlet end of the electrostatic precipitator. The first duct transports the primary flue gas comprising particulate matter, sulfur dioxide and oxygen to the electrostatic precipitator. A second duct is attached to the outlet of the electrostatic precipitator for the discharge of the cleaned flue gas to the atmosphere. A diverter duct is attached to the second duct, wherein the diverter duct transports a portion of the flue gas contained in the second duct to the plasma reactor. The plasma reactor converts a portion of the sulfur dioxide present in the flue gas passing through the plasma reactor to sulfur trioxide to produce a sulfur trioxide-laden flue gas. A return duct attached to the plasma reactor returns the sulfur trioxide-laden flue gas to the first duct upstream of the electrostatic precipitator.

The plasma reactor is preferably a low temperature plasma reactor that comprises, a plasma reactor tube, a microwave generator coupled to the plasma reactor tube, and an electric power supply electrically coupled to the microwave generator. The plasma reactor tube has an inlet end and a discharge end. The interior of the plasma reaction tube from the inlet to the discharge defines the plasma volume. Other low temperature plasma reactor systems, i.e., barrier discharge, radio frequency, etc., can be used.

The conversion process for the oxidation of sulfur dioxide in a primary flue gas stream to sulfur dioxide comprises, the following steps: a) removing a portion of the primary gas stream; b) directing this stream to a low temperature plasma reactor, the interior of which defines a plasma volume; c) passing the portion of the primary flue gas through the plasma volume, such that a fraction of the sulfur dioxide therein is converted into sulfur trioxide to form a sulfur trioxide-laden flue gas; and d) returning the sulfur trioxide laden flue gas to the primary flue gas stream upstream of particulate removal equipment.

The conversion process may also include removing heat from the primary gas stream and transferring the heat to the fossil-fuel fired combustion device inlet air. The removal of heat from the primary gas stream typically takes place upstream of the particulate removal equipment in the main duct.

Preferably, the process of this invention for the efficient removal of particulate matter from a flue gas of a fossil fuel-fired burner that burns low sulfur fossil fuel (less than 1 weight percent), prior to the discharge of the flue gas to the atmosphere comprising the following steps: a) providing a flue gas comprising particulate matter, sulfur dioxide, water in the gaseous form, and oxygen; b) conducting the flue gas to the upstream side of the electrostatic precipitator; c) conducting the flue gas through the electrostatic precipitator; d) diverting a portion of the flue gas downstream of the electrostatic precipitator; e) conducting the diverted flue gas to a plasma reactor and passing the flue gas through the plasma reactor wherein a portion of the sulfur dioxide present in the flue gas is converted to sulfur trioxide to form a sulfur trioxide laden flue gas; f) returning the converted flue gas to the upstream side of the electrostatic precipitator; g) and conducting exhaust gas from the downstream end of the electrostatic precipitator.

BRIEF DESCRIPTION OF THE SEVERAL VIEWS OF DRAWINGS

With this description of the invention, a detailed description follows with reference being made to the accompanying figures of drawings which form part of the specification, in which like parts are designated by the same reference numbers, and of which:

DETAILED DESCRIPTION OF THE INVENTION

Description of the Preferred Embodiment(s)

Figure 1:
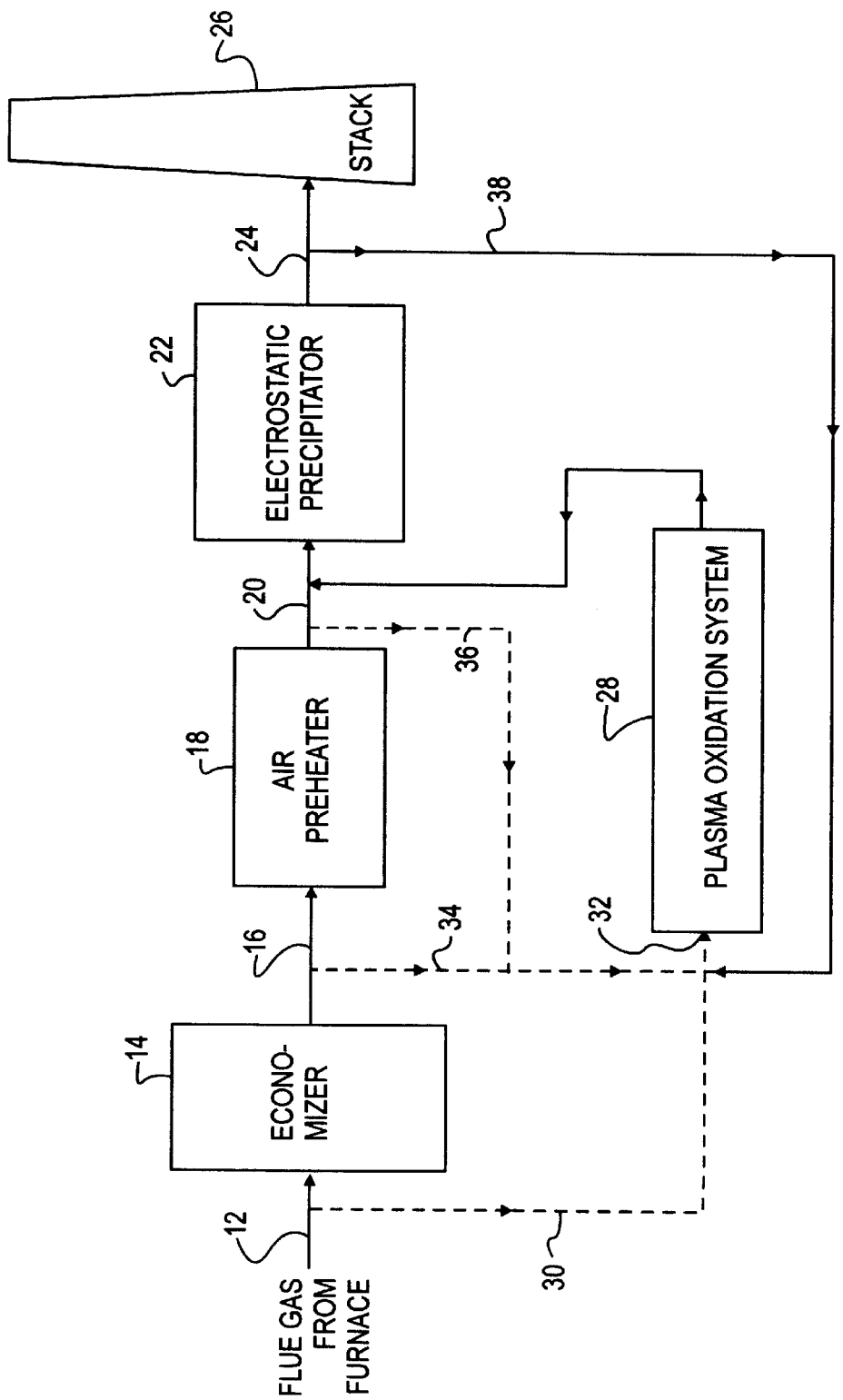
FIG. 1 is a schematic diagram of a boiler waste gas treatment process illustrating a number of possible locations from which flue gas can be drawn for direction through the plasma reactor in order to accomplish the process of this invention.

A typical flue gas clean up system modified to form the apparatus and process of this invention is shown generally at 10 of FIG. 1. This system is typically used to treat the products of combustion produced from coal containing less that 1 weight percent sulfur. The flue gas contains less than 1000 parts per million (ppm) of $SO_2$, and preferably less than 400 ppm of $SO_2$. This process diagram has been simplified to focus on the process components that are relevant to the practice of this invention. Flue gas is generated by a coal-fired boiler or furnace (not shown in FIG. 1). The flue gas, which contains $SO_2$, water vapor or gas, and fly ash, along with other products of combustion, proceeds through duct 12 to economizer 14 wherein some heat is removed from the flue gas to preheat the incoming boiler water. The flue gas exits the economizer 14 and passes through duct 16 to the air preheater 18 where heat is removed from the flue gas in order to preheat air for combustion prior to its introduction to the boiler. The flue gas exiting the air preheater 18 passes through duct 20 and enters the electrostatic precipitator 22 (hereinafter "ESP") where fly ash is removed from the flue gas by processes known in the industry. The gas exiting the ESP 22 passes through exhaust duct 24 and enters an exhaust stack 26 where it is discharged to the atmosphere. The flue gas may pass through other process components to further treat or condition the flue gas. These components have been deleted from the drawing in order to simplify it and the following discussion. Other process components known in the field may be used with the process of the invention, as needed, without taking away from the basic concept of this invention.

Flue gas may be directed to a plasma reactor 28 from one of any number of places along the flue gas clean up system 10. For example, a portion of flue gas may be withdrawn from duct 12, prior to entry into economizer 14, and diverted through economizer bypass duct 30 to the inlet 32 of plasma reactor 28. Alternatively, flue gas can be diverted from duct 16 through air preheater diverter duct 34, from duct 20 through ESP diverter duct 36, or from duct 24 through stack diverter duct 38 (a preferred embodiment) to the inlet 32 of plasma reactor 28.

Figure 2:
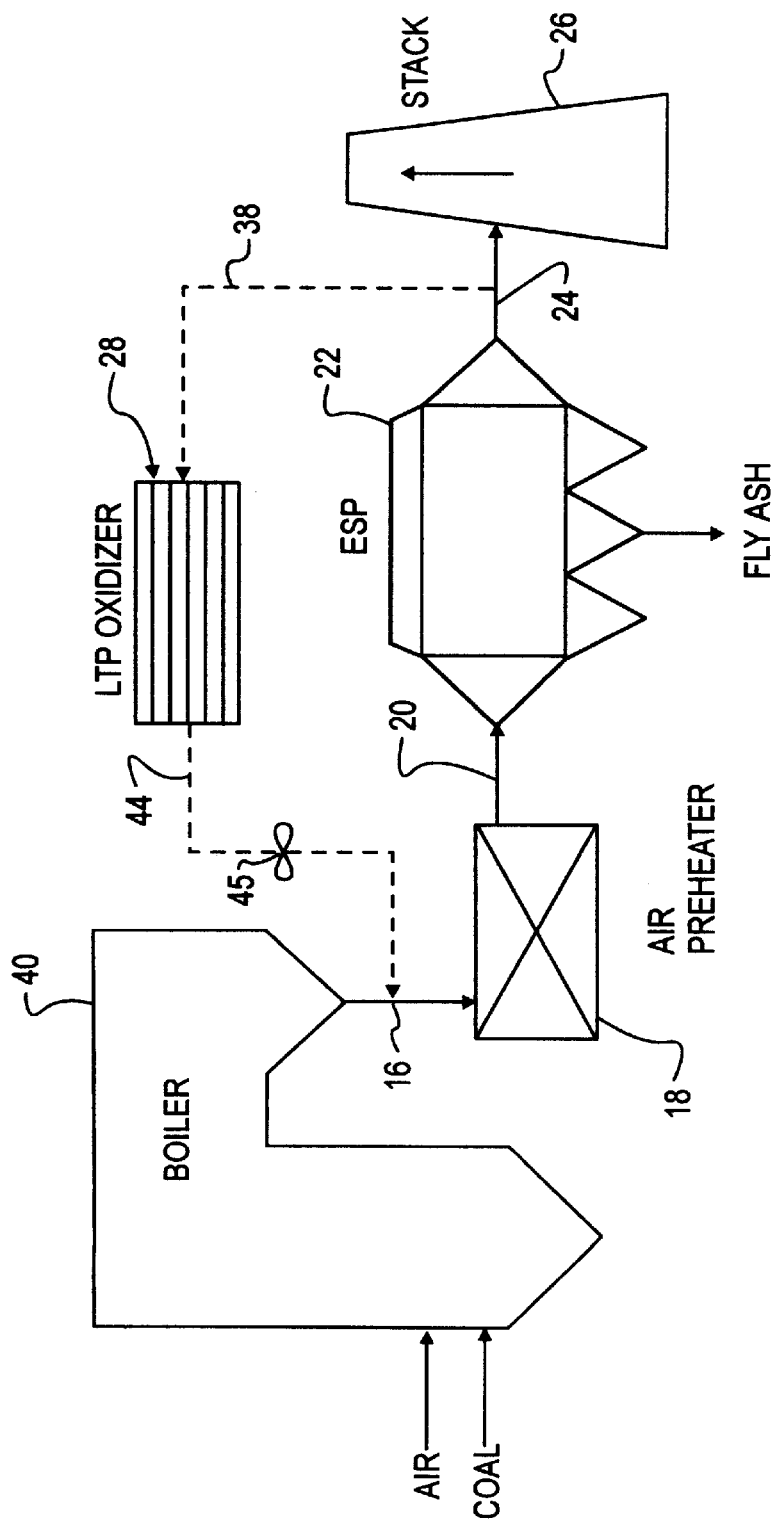
FIG. 2 is a schematic diagram of the waste gas treatment process illustrating the apparatus of this invention illustrating the preferred embodiment of this invention.

The preferred embodiment of the instant invention is illustrated in FIG. 2. As in FIG. 1, the diagram of the flue gas clean up process has been simplified to reduce the complexity of the drawing and the associated discussion. In the preferred embodiment flue gas from a coal fired boiler 40 exits through duct 16, enters air preheater 18, passes on to the ESP 22 through duct 20 and exits through exhaust duct 24 into stack 26. In the preferred embodiment, a portion of the flue gas passing through exhaust duct 24 is diverted through stack diverter duct 38 to the inlet 32 of plasma reactor 28. The flue gas stream proceeds through the plasma reactor 28, exits through plasma outlet 42, and passes through plasma reactor return duct 44 as the flue gas is returned to duct 16 for reentry into the flue gas system upstream of the air preheater. A fan 45 may be installed in the return duct 44 to move flue gas from the low pressure conditions in exhaust duct 24 to the high pressure conditions in duct 16. It is believed that flue gas passing through exhaust duct 24 will be substantially free from fly ash and have a higher concentration of $SO_2$ and oxygen. Flue gas removed from this point in flue gas clean up system will result in less wear on the plasma reactor 28 due to a much lower level of fly ash, while having improved conversion of $SO_2$ to $SO_3$ due to the higher level of $SO_2$ and $O_2$. Further, any energies in the form of heat that is added to the flue gas by the plasma reactor 28 can be recovered by the preheater 18.

Figure 3:
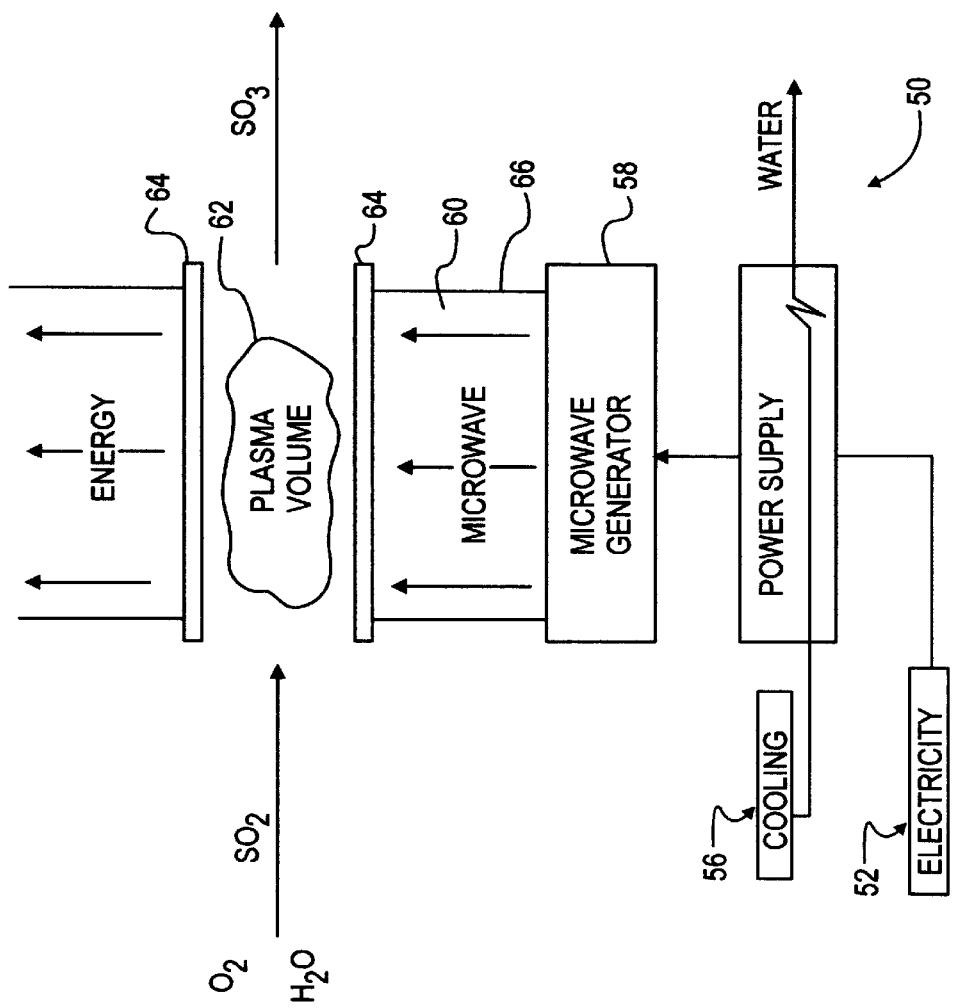
FIG. 3 is a schematic illustration of one possible design of a low temperature plasma reactor.
Figure 3A:
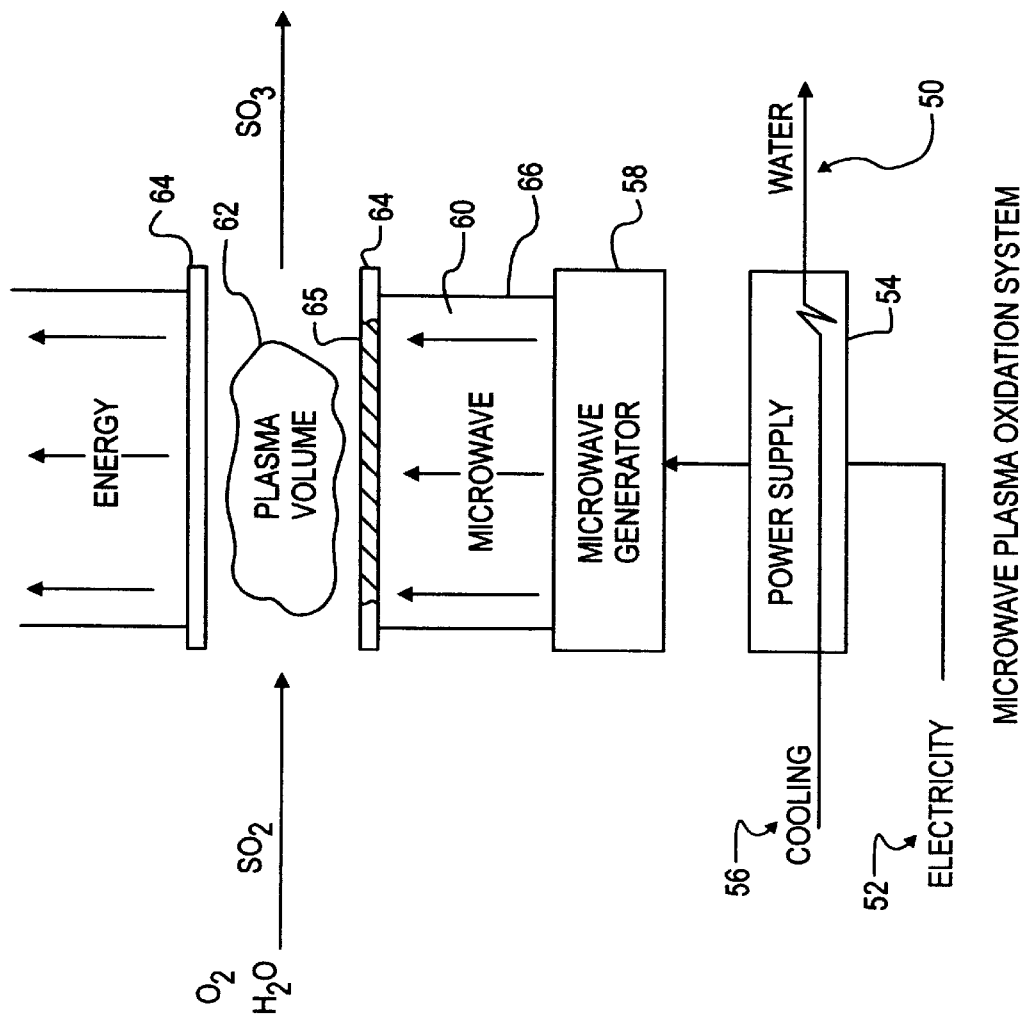
FIG. 3a is a schematic illustration showing a further modification of the low-temperature reactor of FIG. 3.

Any low-temperature nonequilibrium plasma reactor can be used with this invention. One example of a suitable plasma reactor is shown in U.S. Pat. No. 5,542,967. A low-temperature plasma reactor herein is defined as a plasma reactor that increases the temperature of the gas exiting the plasma reactor 28 over the temperature of the incoming gas by from about 25° C. to about 100° C. and preferably from 25° C. to about 50° C. A preferred low-temperature nonequilibrium reactor for use with this invention is shown generally at 50 in FIG. 3. An electrical power source 52 provides electricity to a microwave generator power supply 54. The power supply 54 is cooled by a cooling water source 56. The power supply 54 provides a stable source of power to microwave generator 58 thereby producing a steady source of microwave radiation 60 in the range of from about $10^{-3}$ m to about $5\times10^{-1}$ m (1 millimeter to 50 cm). The input power levels and intensity will be determined by the mass flow rates of the flue gas to be conditioned and the degrees of $SO_2$ to $SO_3$ conversion that is required. The microwave radiation 60 passes through a plasma volume 62 within which the microwave radiation is of sufficient energy and intensity to partially ionize the chemical constituents of the gas stream passing therethrough. The plasma volume 62 may be defined by a conduit 64 in the form of a duct or tube that directs the flow of flue gas through a delineated volume. The conduit 64 should be constructed of a material that is transparent to microwave radiation. Transparent herein means to permit the transmission of radiation without a significant loss in the amplitude of the radiation (Less than a 20% loss). Suitable materials, from which the conduit 64 may be constructed, include but are not limited to: ceramic, glass, or quartz. Alternatively, a window 65 that is transparent to the microwave radiation 60 may be installed in the wall of conduit 64, as shown in FIG. 3a. The microwave radiation 60 passes through the plasma volume 62 and on into the duct containing the flue gas. When a microwave source is used to generate the nonequilibrium plasma a suitable outer container or shield should be installed to absorb or contain the microwave radiation. Further, a waveguide 66 may be installed to direct the microwave radiation 60 to the plasma volume 62. The waveguide 66 helps in preventing a reduction in the intensity of the microwave radiation and to reduce side reactions or problems associated with the uncontrolled distribution of the microwave radiation 60. The microwave generator 58 is thereby coupled to the plasma volume 62 and the conduit 64 in that the microwave radiation 60 is transferred without being diminished significantly in amplitude.

The waveguide 66 referred to hereinabove is a conduit having a circular or rectangular cross-section for directing the microwave radiation 60 from the microwave generator 58 to the plasma reactor 28. The waveguide 66 can be constructed from any suitable material that is opaque and which reflects the microwave radiation 60. Suitable materials for the construction of the waveguide 66 include, but are not limited to: mild steel, stainless steel, aluminum, or iron. The waveguide 66 may be of any suitable linear geometry to direct the microwave radiation 60 as describe hereinabove.

Under normal operating conditions with the apparatus and process of this invention, as shown in FIG. 2, flue gas containing $SO_2$ and $O_2$ is removed from the exhaust duct 24 and is conducted via the stack diverter duct 38 to the plasma reactor 28. Typically, between 5 to 20 volume percent of the gas is diverted and most preferably 10 volume percent is diverted. The flue gas, which contains a mixture of $SO_2$, $O_2$, $H_2O$ gas, and products of combustion; such as carbon dioxide ($CO_2$), carbon monoxide (CO), nitrogen oxides ($NO_x$), and nitrogen, passes through plasma reactor 28 and in particular the plasma volume 62 defined hereinabove. The chemical compounds present in the flue gas stream are ionized to form distinct chemical species. The particular chemical compounds and the associated reactions involve $SO_2$, $O_2$, and $H_2O$ gas. Other reactions may occur, however, they are not important with respect to the instant invention. The important ionizations that take place with the plasma reactor for the purposes of this invention are as follows:

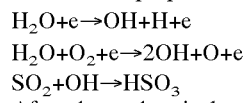

After these chemical constituents leave the plasma volume 62 the following reactions are believed to occur:

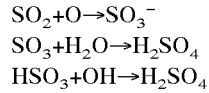

Between 50 and 99 volume percent of the $SO_2$ present in the gas stream is converted to $SO_3$, and preferably between 80 and 90 volume percent of the $SO_2$ present in the gas stream is converted to $SO_3$.

The sulfuric acid ($H_2SO_4$) along with other gaseous components exits through plasma outlet 42, and passes through plasma reactor return duct 44 as the flue gas is returned to duct 16 for reentry into the flue gas clean up system. The $H_2SO_4$ and the other gases mix with the gases present in the air preheater duct 16 and proceed through the system. As the $H_2SO_4$ passes along with the flue gas, a portion of it combines with the fly ash thereby increasing its electrical conductivity. As the higher conductivity fly ash passes through the ESP 22 it is removed from the gas stream by operation of the unit. The other gases, including unreacted $SO_2$ proceed through the ESP 22 and out of the stack 26.

Figure 4:
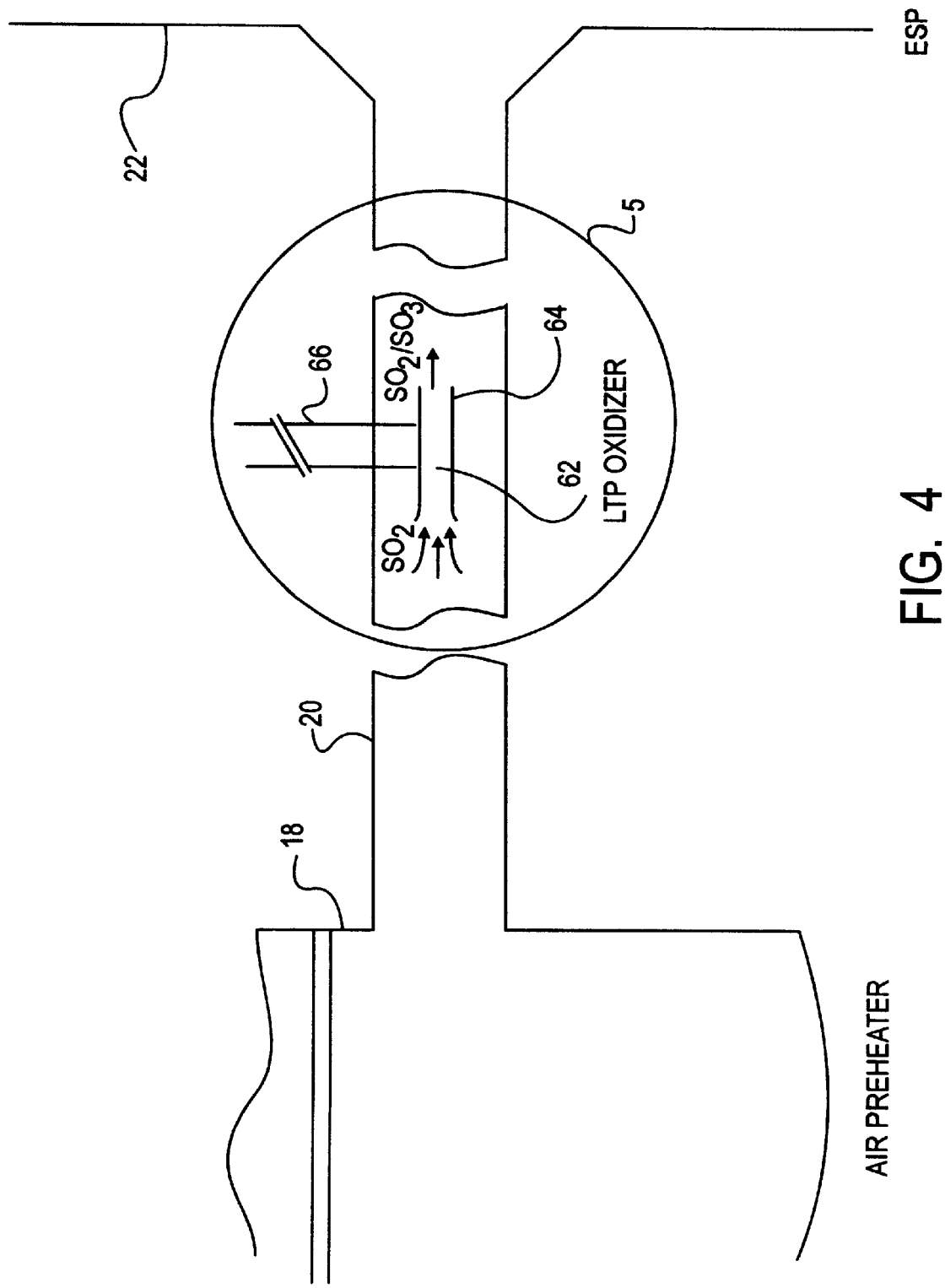
FIG. 4 is a fragmented diagram of a side view illustrating one possible placement for the low temperature plasma reactor, for use with the apparatus of this invention, within the piping between an air preheater and an electrostatic precipitator.
Figure 5:
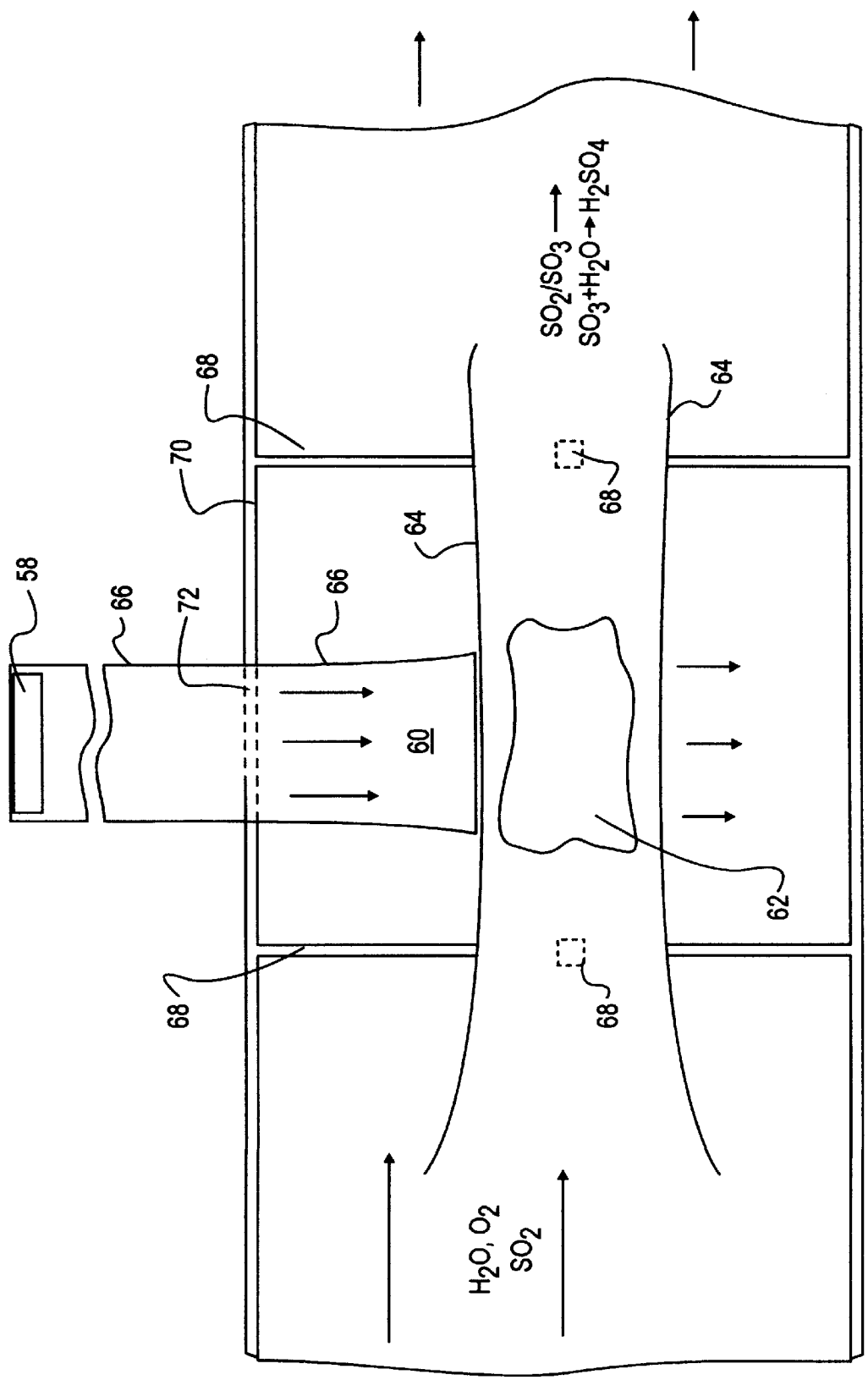
FIG. 5 is an enlarged cross-sectional view of area 5 of FIG. 4 illustrating the placement of the low temperature reactor within the piping between an air preheater and an electrostatic precipitator.
Figure 5A:
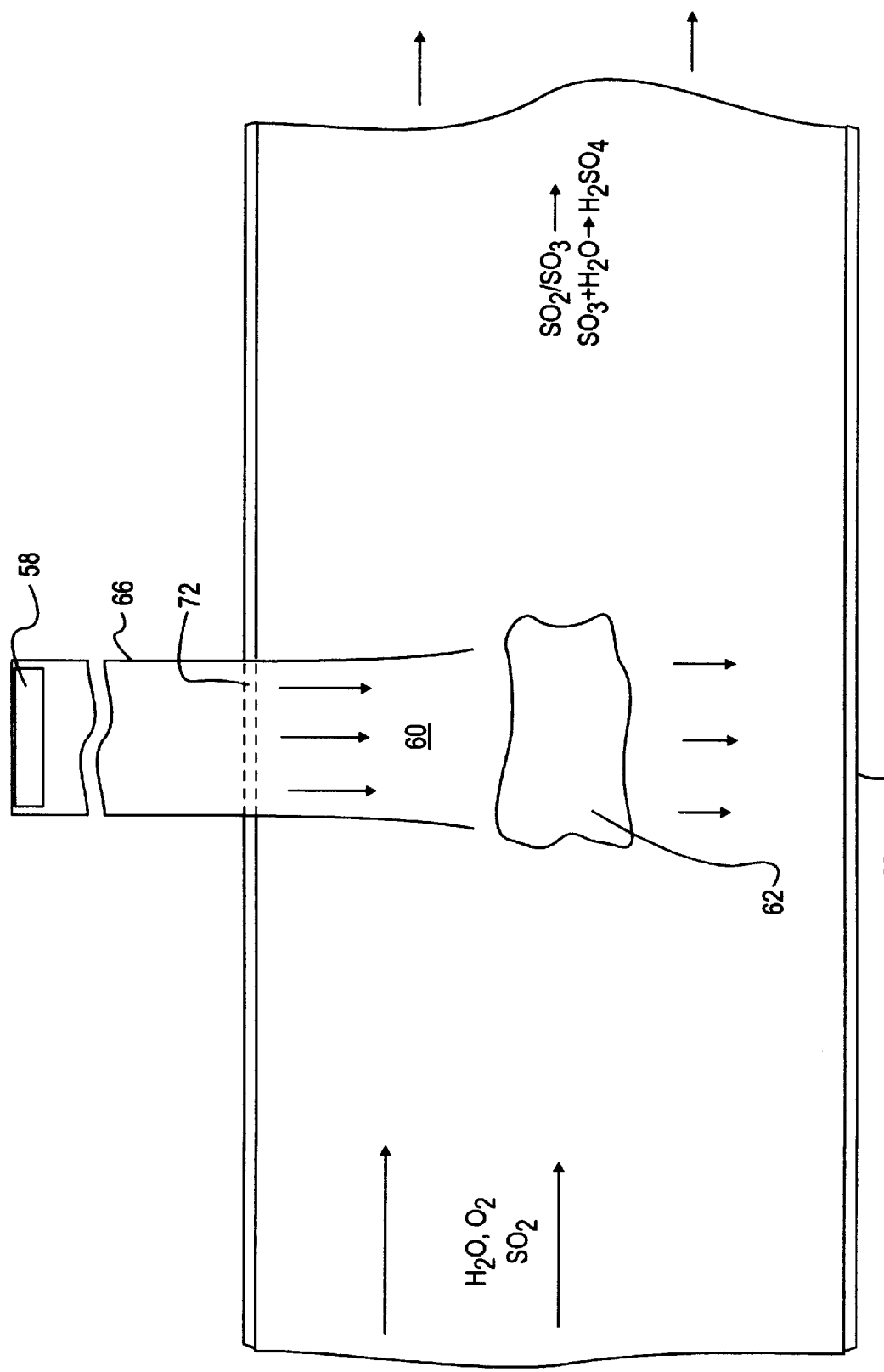
FIG. 5a illustrates the embodiment of FIG. 5 without a plasma conduit.

An alternative arrangement for the placement of the plasma reactor 28 is shown in FIGS. 4 and 5. FIG. 4 illustrates the installation of the plasma reactor 28 in duct 20 between the air preheater 18 and the ESP 22. Although this drawing demonstrates the installation of the plasma reactor 28 immediately upstream of the ESP 22, the plasma reactor 28 can be installed in any duct within the flue gas clean up system upstream of the ESP 22 (FIG. 5). In this embodiment the plasma conduit 64 is held in place within duct 20 by plasma reactor supports 68. A waveguide 66 conducts microwave radiation 60 from the microwave generator 58 through the wall 70 of duct 20 to the plasma reactor conduit 64. A window 72 that is transparent to the microwave radiation may be installed in wall 70 of duct 20 to provide for improved performance while maintaining the flue gas clean up system under preferred operating conditions. The window 72 can be constructed out of any suitable material such as silica glass, ceramic, or quartz. Flue gas, containing a mixture of $SO_2$, $O_2$, $H_2O$ gas and other gases, passes through the plasma conduit 64 and enters the plasma volume 62 wherein the $SO_2$ is dissociated and upon exiting the plasma volume 62 is converted to $SO_3$. The plasma volume 62 can also be created in situ within the flue gas stream without the use of the plasma reactor conduit 64 as is shown in FIG. 5a.

Figure 6:
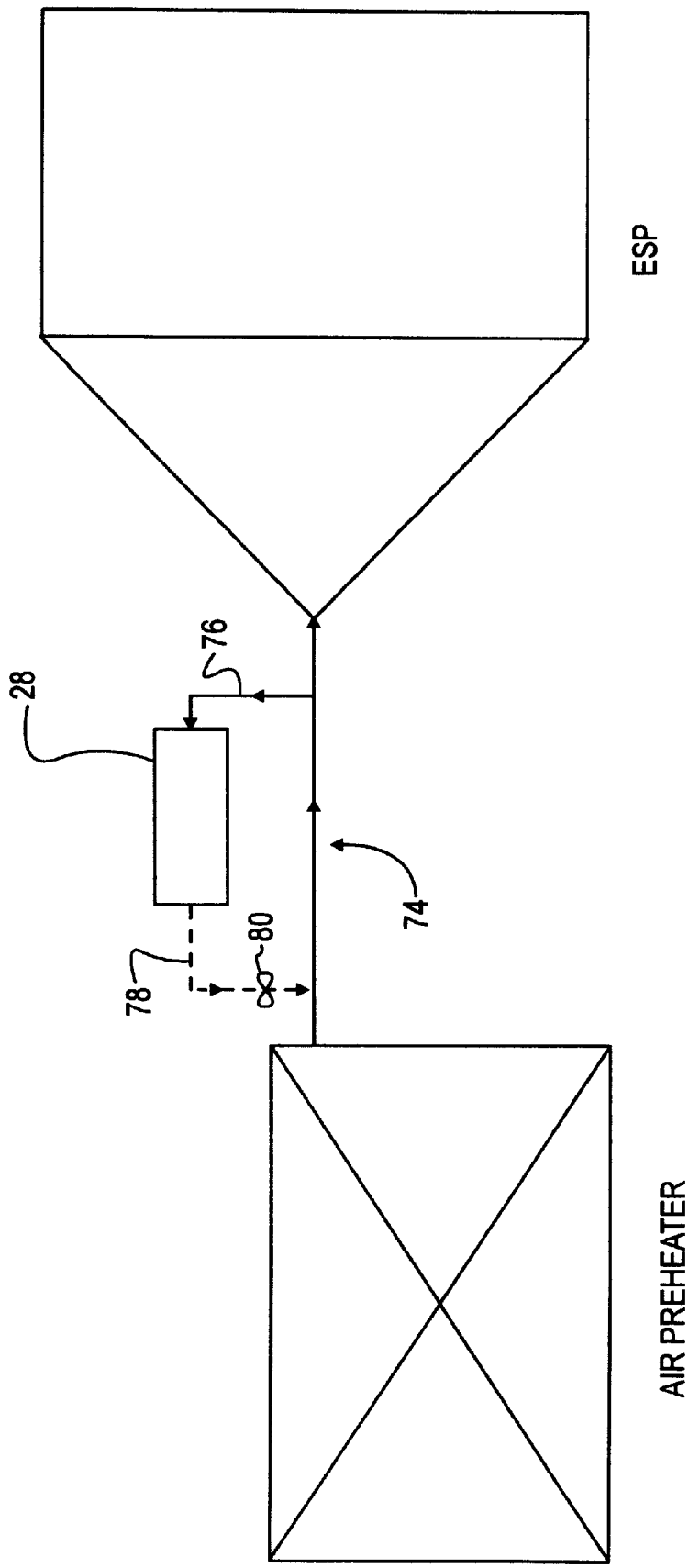
FIG. 6 is a schematic diagram illustrating one possible placement of the low temperature plasma reactor for use with the apparatus of this invention, wherein the plasma reactor is placed outside of the piping between the air preheater and the electrostatic precipitator.

Another embodiment of the instant invention is illustrated in FIG. 6 where the plasma reactor 28 is placed external to a duct 74 within the flue gas clean up system. Flue gas is diverted from the duct 74 through plasma inlet duct 76 and into the plasma reactor 28. The flue gas returns to duct 74 through plasma return duct 78 containing fan 80.

Thus, in accordance with the invention, there has been provided an apparatus for the conversion of at least part of the flue sulfur dioxide present in the flue gas into sulfur trioxide without the need to provide significant modification to the existing gas treatment apparatus and process. There has also been provided an apparatus for the conversion of at least part of the sulfur dioxide present in the flue gas into sulfur trioxide wherein such apparatus is not readily deactivated or damaged by the exhausted flue gas. There has also been provided a process for the conversion of at least a part of the sulfur dioxide present in the flue gas into sulfur trioxide without the need to provide significant modification to the existing gas treatment apparatus and process. Additionally, there has been provided a process for the conversion of a portion of the sulfur dioxide present in the flue gas stream that will minimize the energy lost due to lost heat and process inefficiencies.

With this description of the invention in detail, those skilled in the art will appreciate that modification may be made to the invention without departing from the spirit thereof. Therefore, it is not intended that the scope of the invention be limited to the specific embodiments that have been illustrated and described. Rather, it is intended that the scope to the invention be determined by the scope of the appended claims.

We claim:

1. A conversion process for the oxidation of sulfur dioxide in a primary flue gas stream that is discharged from a fossil-fuel fired combustion device through a main duct to a particulate removal equipment for subsequent discharge to the atmosphere, the conversion process comprising:

removing a portion of the primary gas stream downstream of the particulate removal equipment and directing this stream to a low temperature plasma reactor the interior, of which defines a plasma volume;

passing the portion of the primary flue gas through said plasma volume such that a fraction of the sulfur dioxide therein is converted into sulfur trioxide to form a sulfur trioxide laden flue gas; and returning said sulfur trioxide laden flue gas to the primary flue gas stream upstream of the particulate removal equipment.

2. The conversion process of claim 1 further comprising removing heat from the primary gas stream and transferring the heat to the fossil-fuel fired combustion device inlet air wherein the removal of heat from the primary gas stream takes place upstream of the particulate removal equipment in said main duct.

3. The conversion system of claim 2 wherein returning said sulfur trioxide laden flue gas to the primary flue gas occurs at a place upstream of the location at which heat is removed from the primary gas stream.

4. A conversion system for the oxidation of sulfur dioxide in a primary flue gas stream that is discharged from a fossil-fuel fired combustion device through a main duct to a particulate removal equipment for subsequent discharge to the atmosphere, the conversion system comprising:

a low temperature plasma reactor the interior of which defines a plasma volume;

a means for directing a portion of the primary flue gas stream from downstream of the particulate removal equipment to the plasma volume;

a means for passing the portion of the primary flue gas through said plasma volume such that a major fraction of the sulfur dioxide therein is converted into sulfur trioxide to form a sulfur trioxide laden flue gas; and a means for returning said sulfur trioxide laden flue gas to the primary flue gas stream upstream of the particulate removal equipment.

5. The conversion system of claim 4 wherein an air preheater assembly is arranged upstream of the particulate removal equipment electrostatic precipitator in said main duct.

6. The conversion system of claim 5 wherein said means for returning said sulfur trioxide laden flue gas to the primary flue gas is attached to the main duct upstream of said air preheater assembly.

7. The conversion system of claim 4 wherein said plasma reactor comprises:

a plasma reactor tube having an inlet end and a discharge end, wherein the interior of said plasma reaction tube from said inlet to said discharge defines said plasma volume;

a microwave generator coupled to said plasma reactor tube;

and an electric power supply electrically coupled to said microwave generator.

8. A conversion system for the oxidation of sulfur dioxide present in a primary flue gas stream that is discharged from a fossil-fuel fired combustion device comprising:

a fuel burning device for the combustion of sulfur containing fuels;

an electrostatic precipitator having an inlet end and an outlet end;

a first duct connecting said fuel burning device to said inlet end of said electrostatic precipitator, said first duct transporting the primary flue gas comprising particulate matter, sulfur dioxide and oxygen;

a second duct attached to said outlet of said electrostatic precipitator for the discharge of the flue gas;

a diverter duct attached to said second duct, wherein said diverter duct transports a portion of the flue gas contained in said second duct;

a low temperature plasma reactor, connected to said diverter duct, wherein said low temperature plasma reactor converts a major portion of the sulfur dioxide present in the flue gas passing through said low temperature plasma reactor to sulfur trioxide to produce a sulfur trioxide laden flue gas;

a return duct attached to said low temperature plasma reactor that returns said sulfur trioxide laden flue gas to the first duct upstream of said electrostatic precipitator.

9. The conversion system for the oxidation of sulfur dioxide present in a primary flue gas stream of claim 8 further comprising an air preheater assembly arranged upstream of said electrostatic precipitator in said first duct.

10. The conversion system for the oxidation of sulfur dioxide present in a primary flue gas stream of claim 8 wherein the return duct is attached to the first duct upstream of said air preheater.

11. The conversion system for the oxidation of sulfur dioxide present in a primary flue gas stream of claim 8 wherein said low temperature plasma reactor comprises:

a plasma reactor tube having an inlet end and a discharge end, wherein the interior of said plasma reaction tube from said inlet to said discharge defines said plasma volume;

a microwave generator coupled to said plasma reactor tube;

and an electric power supply electrically coupled to said microwave generator.

12. A process for the efficient removal of particulate matter from a flue gas of a fossil fuel fired burner that burn low sulfur fossil fuel, prior to the discharge of the flue gas to the atmosphere comprising:

providing a flue gas comprising particulate matter, sulfur dioxide, water in the gaseous phase, and oxygen;

conducting the flue gas to the upstream side of said electrostatic precipitator;

conducting the flue gas through said electrostatic precipitator;

diverting a portion of the flue gas downstream of said electrostatic precipitator;

conducting the diverted flue gas to a low temperature plasma reactor and passing the flue gas through said low temperature plasma reactor wherein a major portion of the sulfur dioxide present in the flue gas is converted to sulfur trioxide to form a sulfur trioxide laden flue gas;

returning said sulfur trioxide laden flue gas to the upstream side of said electrostatic precipitator;

and conducting exhaust gas from the downstream end of said electrostatic precipitator.

* * * * *